United States Patent
Wilson et al.

(10) Patent No.: US 9,437,219 B1
(45) Date of Patent: Sep. 6, 2016

(54) MAGNETORESISTIVE READER FOR TWO-DIMENSIONAL MAGNETIC RECORDING

(71) Applicant: Avago Technologies General IP (Singapore) Pte. Ltd., Singapore (SG)

(72) Inventors: Ross S. Wilson, Menlo Park, CA (US); Scott M. O'Brien, Mendota Heights, MN (US); Jeffrey A. Gleason, Mendota Heights, MN (US); Jason P. Brenden, Woodbury, MN (US); Jaydip Bhaumik, Longmount, CO (US); David Fitzgerald, Inver Grove Heights, MN (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/850,144

(22) Filed: Sep. 10, 2015

(51) Int. Cl.
*G11B 5/09* (2006.01)
*G11B 5/60* (2006.01)
*G11B 21/08* (2006.01)
*G11B 5/012* (2006.01)
*G11B 5/39* (2006.01)

(52) U.S. Cl.
CPC ............... *G11B 5/09* (2013.01); *G11B 5/012* (2013.01); *G11B 5/39* (2013.01)

(58) Field of Classification Search
CPC ........... G11B 5/02; G11B 5/012; G11B 5/40; G11B 27/36; G11B 2005/0016; G11B 20/10009; G11B 5/4853; G11B 5/6005; G11B 5/4846
USPC ............ 360/66, 46, 67, 234.5, 245.9, 264.2
See application file for complete search history.

(56) References Cited

U.S. PATENT DOCUMENTS

| | | | | |
|---|---|---|---|---|
| 5,790,334 | A | * 8/1998 | Cunningham | G11B 5/012 360/66 |
| 5,930,052 | A | * 7/1999 | Enomoto | G02B 15/161 359/689 |
| 6,218,903 | B1 | * 4/2001 | Hashimoto | G11B 5/012 29/603.06 |
| 8,988,803 | B1 | 3/2015 | Wilson et al. | |
| 8,988,812 | B1 | 3/2015 | Brunnett et al. | |
| 8,988,829 | B1 | * 3/2015 | Contreras | G11B 5/486 360/234.5 |

OTHER PUBLICATIONS

U.S. Appl. No. 14/577,023, Unpublished (filed Dec. 19, 2014) (Wilson, et al.).

* cited by examiner

*Primary Examiner* — Nabil Hindi (57) ABSTRACT

An apparatus for two-dimensional magnetic recording includes a storage medium, an array of magnetoresistive read heads disposed adjacent the storage medium and spaced to read a data track, a number of leads connected to the array of magnetoresistive read heads, and number of bias circuits connected to the array of read heads by the leads. The bias circuits can be configured to independently bias each of the array of read heads with the array of read heads connected in series or in parallel.

20 Claims, 6 Drawing Sheets

MAGNETORESISTIVE READER FOR TWO-DIMENSIONAL MAGNETIC RECORDING

FIELD OF THE INVENTION

Various embodiments of the present invention provide for a two-dimensional magnetic recording storage system with a magnetoresistive reader system that can bias series-connected or parallel connected heads.

BACKGROUND

In a typical magnetic storage system, digital data is stored in a series of concentric circles or spiral tracks along a storage medium. Data is written to the medium by positioning a read/write head assembly over the medium at a selected location as the storage medium is rotated, and subsequently passing a modulated electric current through the write coil of the head assembly such that a corresponding magnetic flux pattern is induced in the storage medium. To retrieve the stored data, the head assembly is positioned again over the track as the storage medium is rotated. In this position, the previously stored magnetic flux pattern induces a signal in the read head that can be converted to the previously recorded digital data. In a two-dimensional magnetic recording system, the read/write head assembly includes an array of multiple read heads each positioned to read the target track and portions of the two bordering tracks. Signals from the read heads are processed first by a preamplifier, then by a read channel to retrieve the data stored on the storage medium. Because the read heads are moved over the storage medium in the magnetic storage system, the read/write head assembly is connected to the preamplifier by a flexible cable or flex cable. As the number of read heads in the read/write head assembly is increased, the number of conductors in the flexible cable and the circuit area in the preamplifier are increased. Further, unless the read heads are allowed to share common terminals, their spacing and alignment on the assembly will suffer.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components.

DETAILED DESCRIPTION OF THE INVENTION

Embodiments of the present invention are related to a series-connected magnetoresistive (MR) sensors or read heads in an array reader for two-dimensional magnetic recording. Two-dimensional magnetic recording (TDMR) includes the use of an array of sensors in a read head assembly, which are read simultaneously, thereby reading the data track with multiple sensors, and increasing the areal density by accounting for adjacent-track information bordering the principal track. Direct connections between a preamplifier and a read head assembly with N read heads would require 2N terminal pairs, however, this is undesirable as it increases size and degrades flexibility of the flexible cable between the preamplifier and the read head assembly, which is on a movable slider over the storage medium. The preamplifier and read head assembly connection and biasing circuits disclosed herein support head assemblies with N read heads connected either in series; or in parallel with a shared pin. Relative to their common-pin counterparts, series N+1 configurations having an interconnect at each junction permit simpler head fabrication and allow closer MR sensor spacing. Magnetoresistive bias and operating-point control loops are employed, and support both voltage- and current-mode MR biasing. Differential sensing increases robustness against coupled interference.

In some embodiments, the bias and operating-point control loop circuits are reconfigurable to support both series-connected and parallel-connected shared-pin operation. The biasing circuits disclosed herein can bias each read head independently. Each read head can be biased at dissimilar values, and mixed MR head resistances can be accommodated. Good MR read heads can be operated in the presence of bad heads having open or shorted conditions thus potentially increasing manufacturing yields. Semi-differential MR head signal sensing improves immunity to coupled noise.

Figure 1:
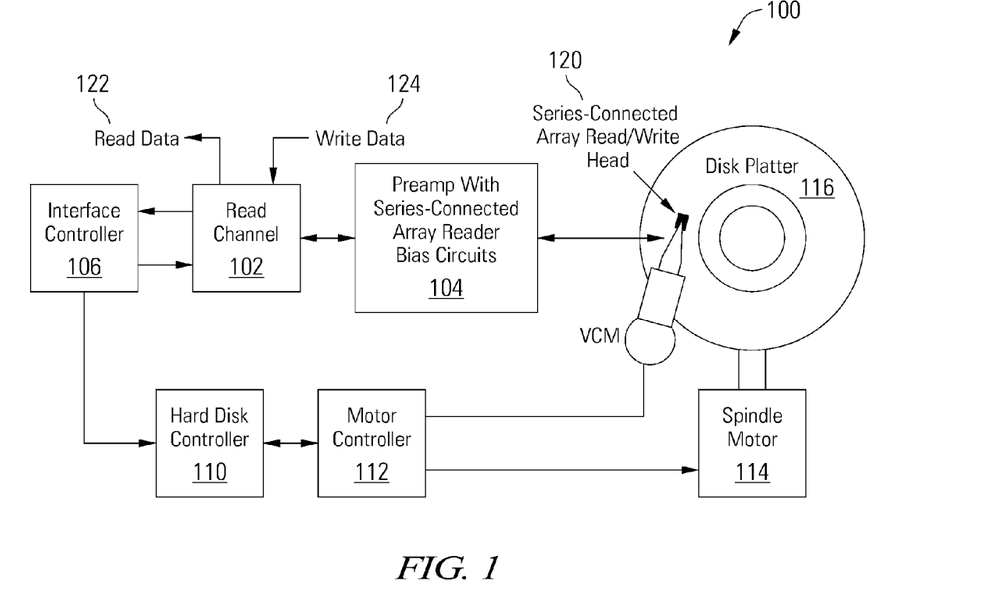
FIG. 1 depicts a two-dimensional magnetic recording storage system including a series-connected magnetoresistive array reader in accordance with some embodiments of the present invention.

Turning to FIG. 1, a storage system 100 is illustrated as an example application of a series-connected array reader for two-dimensional magnetic recording in accordance with some embodiments of the present invention. The storage system 100 includes a read/write head assembly 120 with an array of read heads or magnetoresistive (MR) sensors which can be connected either in series; or in parallel with a shared pin. Storage system 100 may be, for example, a hard disk drive. Storage system 100 also includes a preamplifier 104, an interface controller 106, a hard disk controller 110, a motor controller 112, a spindle motor 114, a disk platter 116, and a read/write head assembly 120. Interface controller 106 controls addressing and timing of data to/from disk platter 116. The data on disk platter 116 consists of groups of magnetic signals that may be detected by read/write head assembly 120 when the assembly is properly positioned over disk platter 116. In one embodiment, disk platter 116 includes magnetic signals recorded in accordance with either a longitudinal or a perpendicular recording scheme.

In a typical read operation, read/write head assembly 120 is accurately positioned by motor controller 112 over a desired data track on disk platter 116. Motor controller 112 both positions read/write head assembly 120 in relation to disk platter 116 and drives spindle motor 114 by moving read/write head assembly 120 to the proper data track on disk platter 116 under the direction of hard disk controller 110. Spindle motor 114 spins disk platter 116 at a determined spin rate (RPMs). Once read/write head assembly 120 is positioned adjacent the proper data track, data magnetically recorded on disk platter 116 are sensed by the array of MR sensors in read/write head assembly 120 as disk platter 116 is rotated by spindle motor 114. The resulting readback signals are provided as continuous, minute analog signals representative of the magnetic data on disk platter 116. These minute analog signals are transferred from read/write head assembly 120 to read channel circuit 102 via preamplifier 104. Preamplifier 104 is operable to amplify the minute analog signals accessed from disk platter 116, as well as to bias the MR sensors in read/write head assembly 120. In turn, read channel circuit 102 digitizes and decodes the received analog signal to recreate the information originally written to disk platter 116. This data is provided as read data 122 to a receiving circuit. A write operation is substantially the opposite of the preceding read operation with write data 124 being provided to read channel circuit 102.

Figure 2:
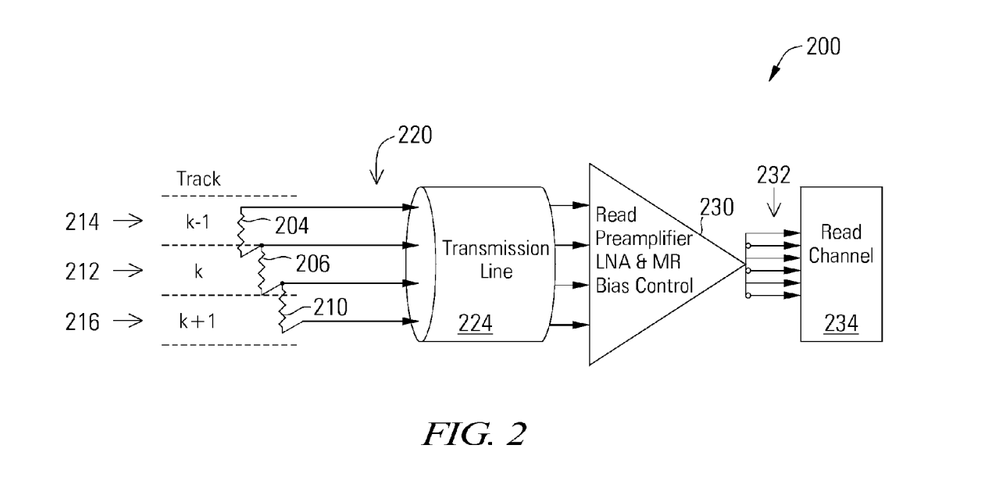
FIG. 2 depicts a head slider with an array of series-connected read heads, a preamplifier and a read channel in accordance with some embodiments of the present invention.

Turning to FIG. 2, a diagram 200 depicts a head slider with an array of N series-connected MR read heads 204, 206, 210 in accordance with some embodiments of the present invention. In the example depicted in FIG. 2, N=3, although any number of MR read heads can be included. The MR read heads 204, 206, 210 are aligned over a central track k 212 on a rotating storage medium. Read head 206 reads the central track k 212; read heads 204, 206 are disposed to either side of the central head 206, and may also read portions of bordering tracks k-1 214 and k+1 216, respectively.

The MR read heads 204, 206, 210 are depicted schematically as resistors; the readback signal may be modeled as a phantom voltage source (not shown) in series with each read head 204, 206, 210. A flexible transmission line interconnect 224 joins the heads 204, 206, 210 to the Preamplifier 230. As the outputs of MR read heads 204, 206, 210 are small, typically <~10 mVpp, they require low-noise amplification (LNA) prior to transmission to the read channel 234, as well as provision of MR bias current.

The signals from heads 204, 206, 210 are sensed semi-differentially by the low noise amplifier in the preamplifier 230. The MR read heads 204, 206, 210 are connected to the preamplifier 230 through a flexible circuit or transmission line 224 which may have N+1 leads 220.

In operation, the head slider with the MR read heads 204, 206, 210 is positioned over a principal data track 212 on a magnetic disk platter, and as the disk platter is rotated, the magnetic medium induces or modulates the electrical currents through the read heads 204, 206, 210. The resulting readback signals on the N+1 leads 220 are representative of the data written to the data track 212, and to some extent of the data written to neighboring data tracks 214, 216.

A low noise amplifier within a preamplifier 230 provides low-noise amplification of the minute analog signals on the N+1 leads 220.

The amplified analog signals are provided to a read channel circuit 234, for example using differential connections 232. The read channel circuit 234 can process the signals in any suitable manner. In some embodiments, the read channel circuit 234 includes an analog front end performing further amplification, biasing, and filtering, one or more analog to digital converters generating digital samples based on the analog signals, equalizers that filter the digital samples, one or more data detectors such as, but not limited to, Viterbi algorithm detectors to identify the values in the equalized data samples, and one or more data decoders such as, but not limited to, Reed Solomon decoders or Low Density Parity Check decoders to perform error detection and correction of the data. Adjacent track interference in the readback signals on the N+1 leads 220 is also sampled and mitigated by multi-dimensional signal-processing algorithms in some embodiments of the read channel circuit 234, leading to improved error-rate performance relative to a single-reader configuration.

The magnetoresistive head biasing circuit in the preamplifier 230 can provide either current bias or voltage bias to the read heads 204, 206, 210. The biasing circuit can be configured to perform only one type of head biasing, or can be configured with both current-mode and voltage-mode biasing, including switching circuitry to provide for selection of the desired method.

Figure 3:
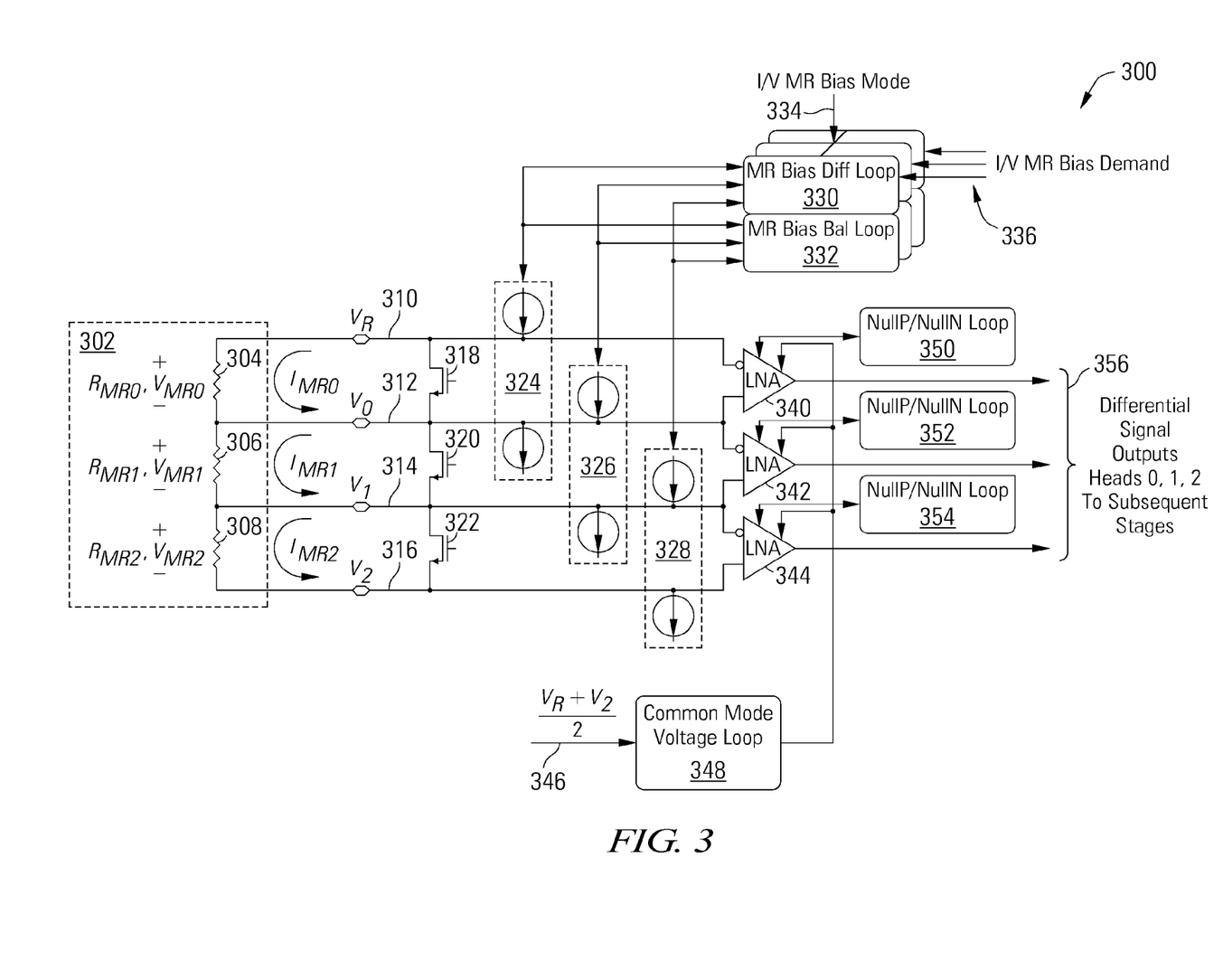
FIG. 3 depicts a series-connected magnetoresistive array reader and associated bias loops, common mode voltage loop, and faulty head bridges in accordance with some embodiments of the present invention.

Turning to FIG. 3, a system 300 with a series-connected magnetoresistive array reader 302 is depicted with three magnetoresistive (MR) heads 304, 306, 308 and associated bias loops, common mode voltage loop, and faulty head bridging devices 318, 320, 322 in accordance with some embodiments of the present invention. Although the array reader 302 is shown with a three-element (304, 306, 308) series-connected N+1 magnetoresistive sensor configuration, embodiments of the present invention are not limited to any particular number of magnetoresistive sensors and can also serve N+1 lead parallel head connections in which all heads share a common terminal. Based upon the disclosure provided herein, one of ordinary skill in the art will recognize a variety of array reader and connection configurations that could be used. For clarity in depicting the bias loops, common mode voltage loop, and faulty head bridging devices in FIG. 3, the transmission-line of FIG. 2 is omitted. Although MR head current direction in FIG. 2 is unipolar, mixed-direction flows can also be supported.

A differential low-noise amplifier (LNA) 340, 342, 344 is associated with each of the three heads 304, 306, 308. In some embodiments, the low-noise amplifiers 340, 342, 344 comprise shunt-feedback amplifiers and are embodied in the preamplifier, although other types and locations of low-noise amplifiers can be used in other embodiments.

To maintain substantially zero leakage current flow in feedback resistors of the low-noise amplifiers 340, 342, 344, individual nulling feedback loops 350, 352, 354 are provided for each feedback resistor in each low-noise amplifier 340, 342, 344. Zero DC current flow in the feedback resistors is desired in order to assure that such currents do not degrade MR bias accuracy. Internal AC coupling in the low-noise amplifiers 340, 342, 344 isolates the input stage from DC head voltage.

The low-noise amplifiers 340, 342, 344 yield differential signal outputs 356 in some embodiments that are provided to subsequent data processing stages, such as to an analog front end in a read channel circuit, including for example a variable gain amplifier, analog to digital converter, detector and decoder, etc.

Independent push-pull current sources 324, 326, 328 bias each MR head 304, 306, 308, respectively. Current intensity in the push-pull current sources 324, 326, 328 is regulated by corresponding triple MR bias differential feedback loops 330 to a programmable DC current in the associated head (current bias), or to the value required to develop a specified DC voltage (voltage bias) across the associated head. In some embodiments, the MR bias differential feedback loops 330 are configurable to current bias mode or voltage bias mode by mode selector input 334. In some other embodiments, the push-pull MR bias sources 330 are statically configured to either current bias mode or voltage bias mode.

A secondary balance feedback loop 332 for each of the push-pull current sources 324, 326, 328 enforces push-pull currents. Provision of push-pull MR bias sources 324, 326, 328 allows each MR head 304, 306, 308 to be independently biased and eliminates MR bias inaccuracy due to current imbalance.

The MR bias differential feedback loops 330 can use any suitable circuitry for controlling current in and out of each MR read head 304, 306, 308. Based upon the disclosure provided herein, one of ordinary skill in the art will recognize a variety of current regulating feedback circuits that may be used in relation to different embodiments of the present invention. Similarly, the balance feedback loops 332 can use any suitable circuitry for detecting imbalances between the push current and the pull current in push-pull current sources 324, 326, 328.

In current bias mode, the push-pull current source 324, controlled or regulated by its associated MR bias differential feedback loop 330 and balance feedback loop 332, establishes a specified bias current $I_{MR0}$ through MR head 304. In voltage bias mode, the push-pull current source 324, controlled or regulated by its associated MR bias differential feedback loop 330 and balance feedback loop 332, establishes a specified bias current $I_{MR0}$ through MR head 304 required to develop a specified DC voltage across MR head 304, hence across terminals $V_R$ 310 and $V_0$ 312.

In current bias mode, the push-pull current source 326, controlled or regulated by its associated MR bias differential feedback loop 330 and balance feedback loop 332, establishes a specified bias current $I_{MR1}$ through MR head 306. In voltage bias mode, the push-pull current source 326, controlled or regulated by its associated MR bias differential feedback loop 330 and balance feedback loop 332, establishes a specified bias current $I_{MR1}$ through MR head 306 required to develop a specified DC voltage across MR head 306, hence across terminals $V_0$ 312 and $V_1$ 314.

In current bias mode, the push-pull current source 328, controlled or regulated by its associated MR bias differential feedback loop 330 and balance feedback loop 332, establishes a specified bias current $I_{MR2}$ through MR head 308. In voltage bias mode, the push-pull current source 328, controlled or regulated by its associated MR bias differential feedback loop 330 and balance feedback loop 332, establishes a specified bias current $I_{MR2}$ through MR head 308 required to develop a specified DC voltage across MR head 308, hence across terminals $V_1$ 314 and $V_2$ 316.

To maintain low head-to-disc potential and prevent arcing across the nanometer-length fly-height distance, a common-mode voltage (CMV) loop 348 regulates the mean end-to-end voltage of the string of MR heads 304, 306, 308 to zero, or to a programmable value 346 chosen by the user. Note that end-potentials of the string of MR heads 304, 306, 308 are dependent on choice of head current direction. In the unipolar direction illustrated, assuming for simplicity's sake that all heads are biased to $V_{MR}$, the voltages at the ends of the string are $+3V_{MR}/2$; whereas they are $\pm V_{MR}/2$ if the direction of current in the center head 306 is reversed.

In some embodiments, limited two-dimensional magnetic recording head functionality can be maintained in the presence of damaged sensors. To this end, whichever one or two of heads 304, 306 or 308 are faulty are bridged by an associated NMOS or other switch 318, 320, 322, preserving string continuity in the presence of open or very high resistance heads. To conserve power, the low-noise amplifier 340, 342, 344 and MR bias elements 324, 326, 328, 330, 332 associated with the defective head 304, 306 or 308 are powered down. Detection of damaged sensors can be performed in any suitable manner, such as, but not limited to, a determination by the MR bias differential feedback loop 330 and/or balance feedback loop 332 that demanded currents are substantially higher or lower than expected. Note that common mode voltage loop 348 regulates mean string potential to zero, a process which relies on active buffers in LNA 340 and 344 to produce isolated replicas of voltages $V_R$ 310 and $V_2$ 316. If either/both of these LNAs are powered down, the common mode calculation must switch to LNA(s) having active buffers.

Figure 4:
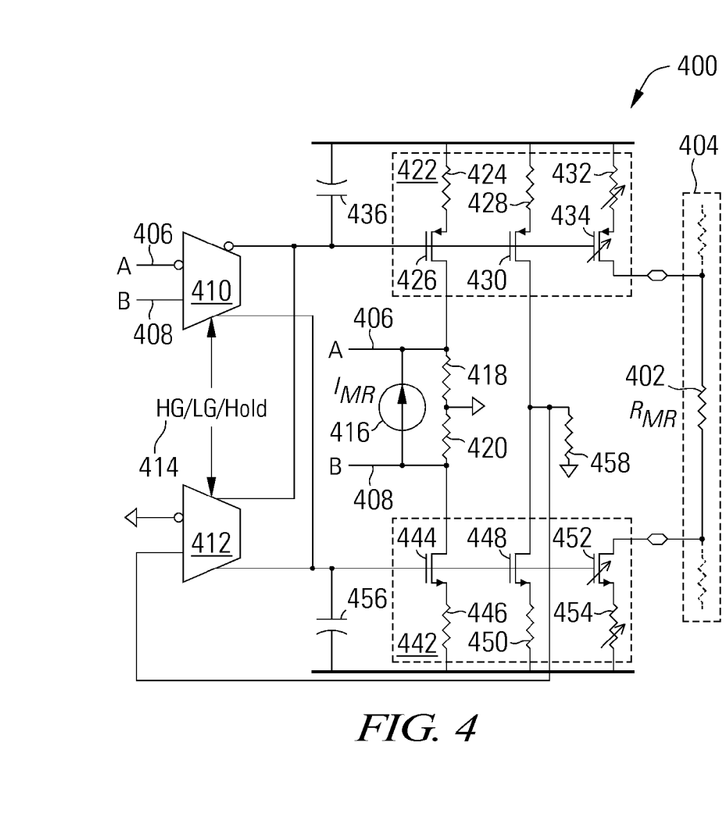
FIG. 4 depicts a current-mode head bias circuit for a magnetoresistive sensor in a series-connected array reader in accordance with some embodiments of the present invention.
Figure 5:
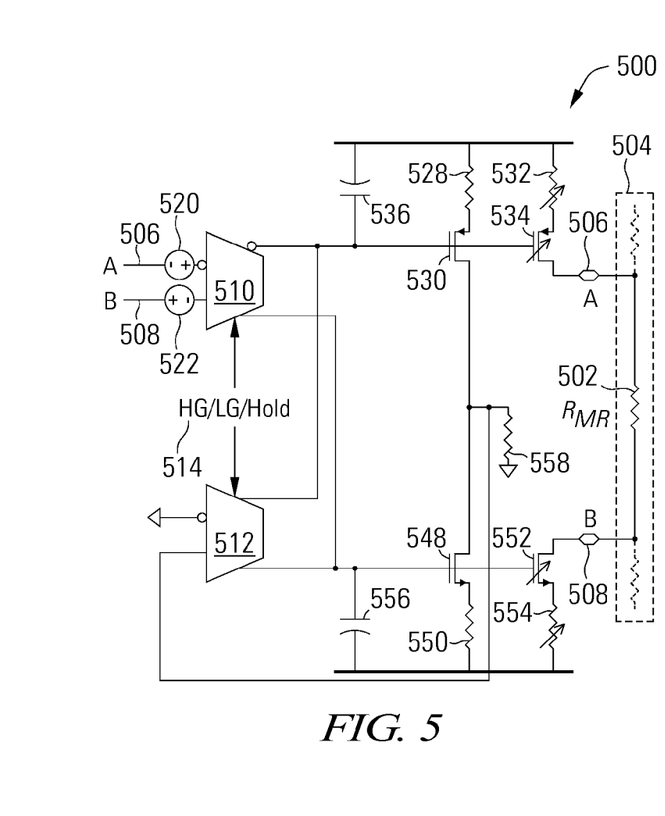
FIG. 5 depicts a voltage-mode head bias circuit for a magnetoresistive sensor in a series-connected array reader in accordance with some embodiments of the present invention.

Turning to FIGS. 4 and 5, FIG. 4 depicts the joint structure of MR Bias Diff Loop 330 and MR Bias Bal Loop 332, for current-mode bias operation in accordance with some embodiments of the present invention. FIG. 5 is a similar depiction, for voltage-mode operation. In some embodiments, the current-mode head bias circuit 400 and the voltage-mode head bias circuit 500 can be used as the MR bias differential feedback loop 330 and/or balance feedback loop 332 in FIG. 3. In some embodiments, a single bias circuit is associated with each MR head of the series string, and is switchably reconfigured between current- and voltage-bias mode. In some other embodiments, a statically configured current-mode or voltage-mode head bias circuit 400 and 500 can be used. Isolating emitter-follower buffers are omitted from FIGS. 4 and 5, for clarity. No limitation is implied by use of MOS or bipolar devices at particular locations in the current-mode and voltage-mode head bias circuits 400 and 500.

In current-bias mode, an NMOS/PMOS transistor complementary pair 434, 452 delivers push-pull currents to the associated MR head 402 in a series-connected sensor string 404. FIG. 4 references the middle head 402, although similar bias sources are used for all heads. An additional NMOS/PMOS transistor complementary pair 430, 448 are connected to a load resistor $R_{BalRL}$ 458 to provide balance-loop feedback. A third NMOS/PMOS transistor complementary pair 426, 442 senses current and closes the differential loop. The three upper PMOS devices 426, 430, 434 and their degeneration resistors 424, 428, 432 in box 422 are matched, as are the lower NMOS devices 444, 448, 452 and their degeneration resistors 446, 450, 454 in box 442.

To achieve true push-pull current sourcing/sinking, the balance loop operates to regulate the potential across a load resistor $R_{BalRL}$ 458 to zero, at which point PMOS-sourced and NMOS-sinked currents match. Loop-gain relative to the reference point between transistor pair 430, 448 is found as:

$$LG_{IBias} \cong -\frac{g_{mMBal\_OTA}}{j\omega C_{MRBIAS}} \cdot \frac{R_{BalRL}}{R_{BalDegen}} \quad \text{(Eq 1)}$$

where $g_{mMBal\_OTA}$ is the transconductance or differential-out/differential-in value of the MR balance operational transconductance amplifier (OTA) 412, $C_{MRBIAS}$ is the capacitance of loop compensating capacitors 436, 456, $R_{BalRL}$ is the resistance of balance loop load resistor $R_{BalRL}$ 458, and $R_{BalDegen}$ is the resistance of balance dummy stage degeneration resistor 428.

The differential current-regulating loop drives the voltage across each of the current sensing resistors $R_{ISenseRL}$ 418, 420 to zero. As the MR bias demand current $I_{MR}$ 416 is poled oppositely to current flow from the MOS devices 426, 444, at null the current from each MOS device 426, 444 equals $I_{MR}$. Differential loop-gain at the A/B reference-points 406, 408 is:

$$LG_{IBias} \cong -\frac{g_{mMRBal\_OTA}}{j\omega C_{MRBIAS}} \cdot 2 \frac{R_{ISenseRL}}{R_{ISenseDegen}} \qquad (\text{Eq 2})$$

where $g_{mMRBias\_OTA}$ is the transconductance or differential-out/differential-in value of the MR bias operational transconductance amplifier (OTA) 410, $R_{ISenseRL}$ is the resistance of the sense resistors 418, 420, and $R_{ISenseDegen}$ is the resistance of the degeneration resistor 424.

The operational transconductance amplifiers 410, 412 in the differential and balance loops operate in differential- and common-mode respectively to drive the two loop-compensating capacitors $C_{MRBIAS}$ 436, 456.

It is possible to control MR head current $I_{MR}$ either by varying demand (source 416) directly; or by altering the ratioing between the regulating loop and output devices. The loop-gains described in Equations 1 and 2 yield a stable single-time-constant closed-loop CLG=LG/(1+LG) to disturbance injected at the reference-points 406, 408. To simplify the loop-gain expressions, the MOS source resistances $r_s$ have been incorporated into the degeneration resistor values. In all cases, to minimize noise contribution of the magnetoresistive head bias circuits, degeneration resistor values should be maintained as large as possible commensurate with available headroom.

The transconductance of operational transconductance amplifiers 410, 412 of all loops are digitally controlled in some embodiments through the HG/LG/Hold terminals 414 to force high gain/wide loop bandwidth during the initial (acquisition) portion of a Read; to force low gain/low bandwidth during the active portion of the Read; and to hold the state of the prior Read between Reads.

Turning to FIG. 5, the voltage-mode head bias circuit 500 for a magnetoresistive sensor in a series-connected array reader is depicted in accordance with some embodiments of the present invention. Balance loop function in voltage-bias mode is identical in some embodiments to that in the current-bias mode depicted in FIG. 4. An NMOS/PMOS transistor complementary pair 534, 552 delivers push-pull currents through degeneration resistors 532, 554 to the associated MR head 502 in a series-connected sensor string 504. FIG. 5 references the middle head 502, although similar bias sources are used for all heads. An additional NMOS/PMOS transistor complementary pair 530, 548 are connected to a load resistor $R_{BalRL}$ 558 to provide balance-loop feedback.

To achieve true push-pull current sourcing/sinking, the balance loop operates to regulate the potential across a load resistor $R_{BalRL}$ 558 to zero, at which point PMOS-sourced and NMOS-sinked currents match. Loop-gain relative to the reference point between transistor pair 530, 548 is described in Equation 1, where a $g_{mMBal\_OTA}$ is the transconductance of the MR balance operational transconductance amplifier (OTA) 512, $C_{MRBIAS}$ is the capacitance of loop compensating capacitors 536, 556, $R_{BalRL}$ is the resistance of balance loop load resistor $R_{BalRL}$ 558, and $R_{BalDegen}$ is the resistance of balance dummy stage degeneration resistors 528, 550.

The differential MR bias voltage-regulating loop senses the voltage across MR head 502, subtracts it from a $V_{MR}$ setpoint established by sources 520, 522, and drives the result to zero. The loop-gain is therefore:

$$LG_{VBias} \cong -\frac{g_{mMRBias\_OTA}}{j\omega C_{MRBIAS}} \cdot \frac{1}{R_{Degen}} \cdot \frac{R_{MR} \parallel Z_{EFF}}{2} \qquad (\text{Eq 3})$$

where a $g_{mMRBias\_OTA}$ is the transconductance or differential-out/differential-in value of the MR bias operational transconductance amplifier (OTA) 510, $R_{Degen}$ is the resistance of the degeneration resistors 532, 554, $R_{MR}$ is the resistance of MR head 502, and $Z_{EFF}$ is the effective impedance shunting the $R_{MR}$ of the MR head 502 and arising from presence of the other read heads, other voltage-bias loops; and the low-noise amplifiers and their associated nulling loops.

The operational transconductance amplifiers 510, 512 in the differential and balance loops operate in differential- and common-mode respectively to drive the two loop-compensating capacitors $C_{MRBIAS}$ 536, 556. The loop-gains described in Equations 1 and 3 yield a stable single-time-constant closed-loop CLG=LG/(1+LG) to disturbance injected at the reference-points 506, 508. To simplify the loop-gain expressions, the MOS source resistances $r_s$ have been incorporated into the degeneration resistor values.

The transconductance of operational transconductance amplifiers 510, 512 of all loops are digitally controlled in some embodiments through the HG/LG/Hold terminals 514 to force high gain/wide loop bandwidth during the initial (acquisition) portion of a Read; to force low gain/low bandwidth during the active portion of the Read; and to hold the state of the prior Read between Reads.

Figure 6:
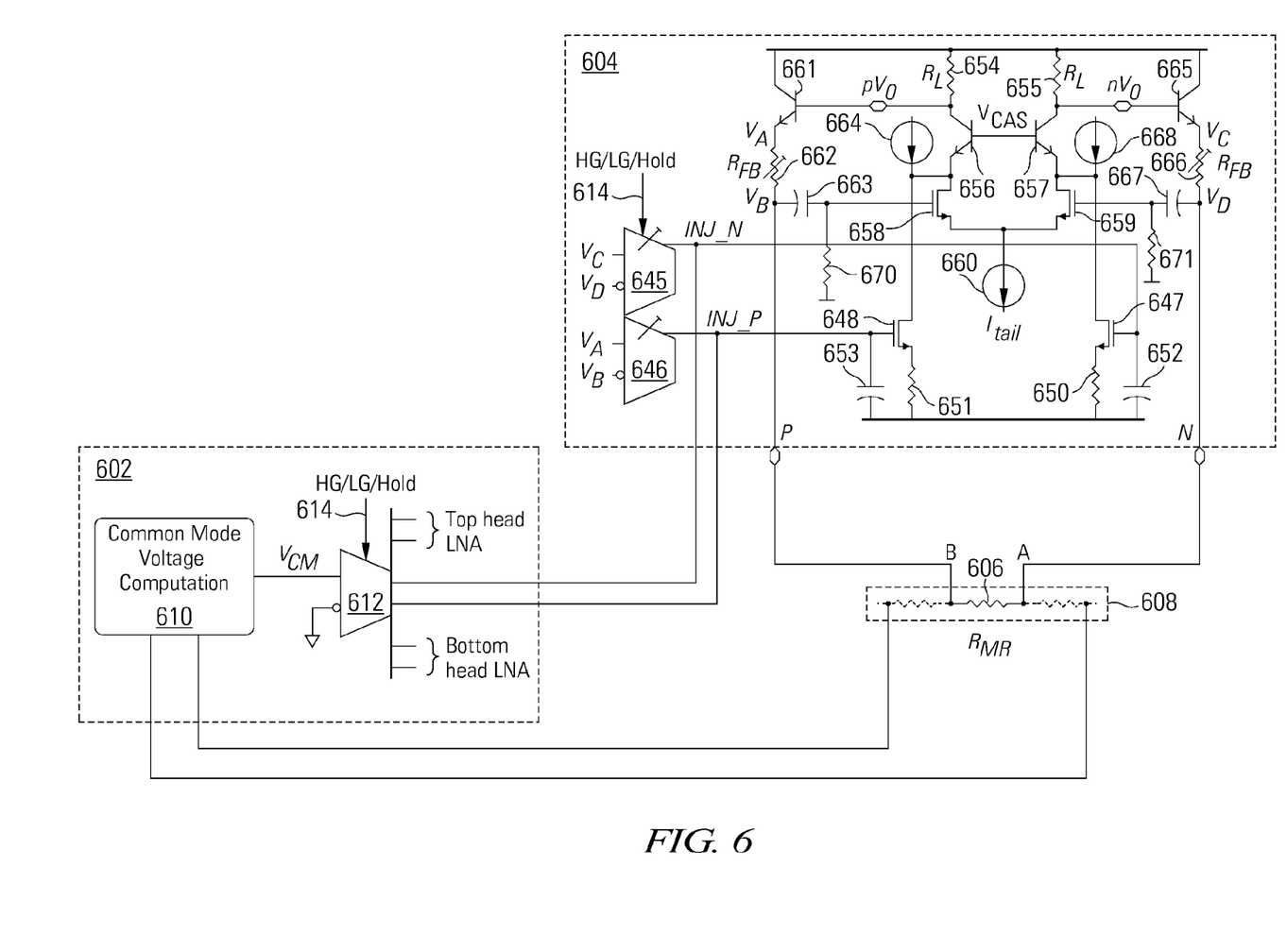
FIG. 6 depicts a low-noise amplifier and associated nulling loops for a magnetoresistive sensor in a series-connected array reader in accordance with some embodiments of the present invention.

Turning now to FIG. 6, a low-noise amplifier and associated nulling loops 604 and common mode voltage loop 602 for a magnetoresistive sensor in a series-connected array reader is depicted in accordance with some embodiments of the present invention. FIG. 6 depicts the low-noise amplifier and associated nulling loops 604 corresponding to the middle MR head 606. Copies of the same circuitry are associated with other MR heads in the series-connected string 608 in some embodiments. The common mode voltage loop 602 is shared by all low-noise amplifiers.

The low-noise amplifier 604 is a differential shunt-feedback configuration, shown here with a long-tailed NMOS input stage. Other input configurations such as bipolar differential pairs or P/NMOS stacked current-reuse pairs can be used in other embodiments.

The gates of a differential pair of input transistors 659, 658 in the low-noise amplifier 604 are connected across the MR read head 606 through AC coupling capacitors $C_B$ 663, 667. Input AC coupling is used in order to prevent the input stage from being saturated by the DC bias voltage appearing across the MR head $R_{MR}$ 606. The common sources of the differential pair of input transistors 659, 658 are connected to a tail current source 660. The drains of the differential pair of input transistors 659, 658 are connected to load resistors 654, 655 through bipolar junction cascode transistors 656, 657 having common bases biased at cascode voltage $V_{CAS}$.

The differential output nodes between the cascode transistors 656, 657 and the load resistors 654, 655 are connected to the bases of shunt feedback transistors 661, 665. The emitter-follower shunt feedback transistors 661, 665 are connected in series with variable feedback resistors 662, 666 between the power rail and the input nodes. The input impedance of the low-noise amplifier 604 is programmed by varying the feedback resistors 662, 666. In shunt-feedback configurations, the midband differential input impedance is given approximately by:

$$Z_{IN} = 2 \cdot \frac{R_{FB}}{1 + g_m R_L} \quad \text{(Eq 4)}$$

where $g_m$ is the transconductance of one side of the input differential pair, where $R_{FB}$ is the resistance of the corresponding feedback resistor 662 or 666, and where $R_L$ is the resistance of the corresponding load resistor 654 or 655.

Within the low-noise amplifiers (e.g., 604), it is important to assure that no DC current flows in the feedback resistors 662, 666 as current flow would degrade MR bias accuracy. Nulling loops comprising two operational transconductance amplifiers 645, 646 and associated compensating capacitors 652, 653 individually sense the DC voltage across their corresponding feedback resistors. Gate leak resistors $R_{LEAK}$ 670, 671 are provided in some embodiments between the gates of transistors 658, 659 and a bias potential. During a normal Read, the time-constant $R_{LEAK} \times C_B$ is chosen in some embodiments to yield a coupling pole well below 100 KHz or whatever the desired LF cutoff is for the two-dimensional magnetic recording reader. The resistance $R_{LEAK}$ of gate leak resistors 670, 671 is reduced momentarily in some embodiments upon Read startup, to allow quick operating-point acquisition.

Operational transconductance amplifier 645 senses the DC voltage across feedback resistor 666, and operational transconductance amplifier 646 senses the DC voltage across feedback resistor 662. The operational transconductance amplifiers 645, 646 in the nulling loops force the voltages across the feedback resistors 662, 666 to zero using voltage-controlled current sources comprising transistors 647, 648, resistors 650, 651, and current sources 668, 664. In some embodiments, the corrective currents from the nulling feedback loop are injected into the emitters of cascode transistors 656, 657 as shown in FIG. 6, reducing parasitic effects. However, other injection points can be used in other embodiments.

The low-noise amplifier output is taken at the differential output nodes between the cascode transistors 656, 657 and the load resistors 654, 655, and directly reflects the voltage $V_{MR}$, the voltage across the corresponding MR read head (e.g., 606). This voltage can be blocked from subsequent gain stages by AC coupling the low-noise amplifier outputs.

The common-mode voltage of the series-connected MR head string 608 is regulated by the shared common-mode voltage loop 602. The mean string common-mode voltage $$V_{CM} = \frac{V_{TOP} + V_{BOTTOM}}{2}$$

is computed by common mode voltage computation circuit 610 and regulated to zero/GND by the common-mode operational transconductance amplifier 612, which is shared by all MR heads in the string 608. The six, tracking, outputs from common-mode operational transconductance amplifier 612 are applied to the nulling loop compensating capacitors 652, 653 where they act through the injection stage, the load resistors $R_L$ 654, 655, the injection resistors $R_{INJ}$ 650, 651 equally to influence all junction-points of the series-connected MR string 608. Common-mode voltage loop-gain is given by:

$$LG_{CM} \cong -\frac{g_{mCM\_OTA}}{j\omega C_{NULL}} \cdot \frac{R_L}{R_{INJ}} \times \frac{j\omega \tau_Z + 1}{j\omega \tau_P + 1} \quad \text{(Eq 5)}$$

where $g_{mCM\_OTA}$ is a single-ended output/input value, $C_{NULL}$ is the capacitance of nulling capacitors 652, 653, and where $\tau_Z$, $\tau_P$ arise, respectively, from head parasitic capacitance, and from the $R_{LEAK} \times C_B$ time constant where $C_B$ is the capacitance of AC coupling capacitors 663, 667.

The transconductance of operational transconductance amplifiers 645, 646, 612 of all loops are digitally controlled in some embodiments through the HG/LG/Hold terminals 614 to force high gain/wide loop bandwidth during the initial (acquisition) portion of a Read; to force low gain/low bandwidth during the active portion of the Read; and to hold the state of the prior Read between Reads. This adjusts the transconductance to account for variation in attached MR head resistance $R_{MR}$ and feedback resistance $R_{FB}$. Thus, the operational transconductance amplifiers 645, 646, 612 are operable in high and low gain modes, corresponding to Fast-acquisition-from-Write and Read phases. The operational transconductance amplifiers 645, 646, 612 are disabled between Reads, allowing the feedback loop state to be preserved.

In voltage bias mode, the nulling and MR bias differential loops interact. To reduce adverse effects, in some embodiments the MR bias loop bandwidth is set at about twice that of the nulling loops. A stiff MR bias voltage mode loop tends to decouple the individual nulling loops. In current-bias mode, the bias loops are decoupled from the nulling loops. However, the multiple nulling loops can interact with each other.

Figure 7:
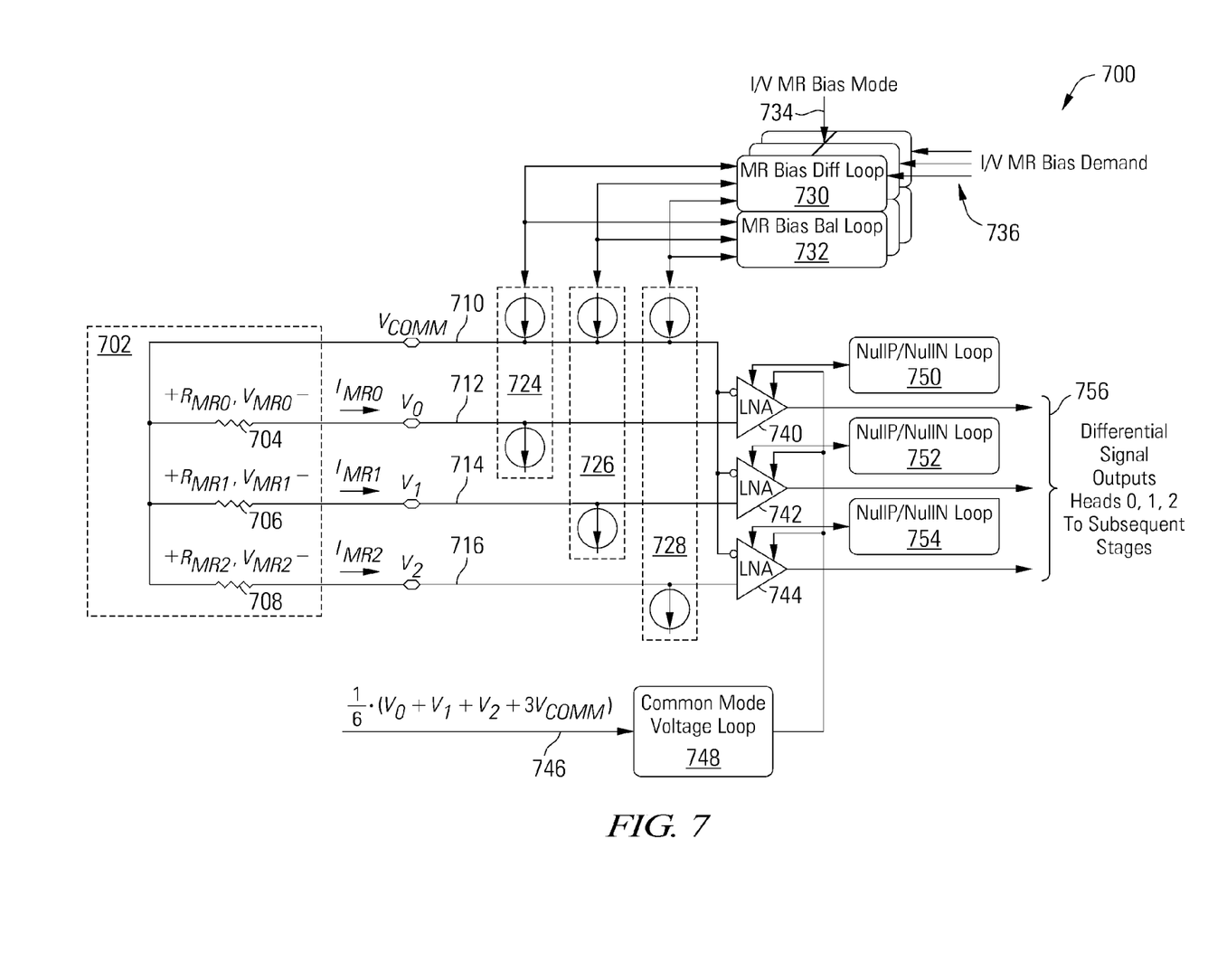
FIG. 7 depicts a parallel-connected magnetoresistive array reader with a shared pin, and associated bias loops and common mode voltage loop in accordance with some embodiments of the present invention.

The concepts of FIG. 3 can also be applied to a common/shared-pin MR connection in a two-dimensional magnetic recording system. Turning now to FIG. 7, a system 700 with a parallel-connected magnetoresistive array reader with a shared pin is depicted, with associated bias loops and common mode voltage loop, in accordance with some embodiments of the present invention. In this embodiment, each MR head 704, 706, 708 is connected between a common or shared pin 710 and their respective dedicated pins 712, 714, 716. In this embodiment, no faulty-head bridging is needed, although low-noise amplifiers and bias sources associated with faulty heads can be disabled to conserve power.

Although the array reader 702 is shown with a three-element (304, 706, 708) parallel shared-pin N+1 magnetoresistive sensor configuration, embodiments of the present invention are not limited to any particular number of magnetoresistive sensors.

A differential low-noise amplifier 740, 742, 744 is associated with each of the three heads 704, 706, 708. One input of each differential low-noise amplifier 740, 742, 744 is connected to the shared-pin $V_{COMM}$ 710, with the other input of each differential low-noise amplifier 740, 742, 744 being connected to one of the dedicated pins 712, 714, 716, respectively, of the MR head 704, 706, 708, in contrast to the series-connected configuration of FIG. 3 in which the inputs of each differential low-noise amplifier 340, 342, 344 were connected across one of the MR heads 304, 306, 308.

As in series mode, to maintain substantially zero leakage current flow in feedback resistors of the low-noise amplifiers 740, 742, 744, individual nulling feedback loops 750, 752, 754 are provided for each feedback resistor in each low-noise amplifier 740, 742, 744.

The low-noise amplifiers 740, 742, 744 yield differential signal outputs 756 in some embodiments that are provided to subsequent data processing stages, such as to an analog front end in a read channel circuit, including for example a variable gain amplifier, analog to digital converter, detector and decoder, etc.

Independent push-pull current sources 724, 726, 728 are all commoned to the shared-pin $V_{COMM}$ 710, and the sinks drain from individual MR heads 704, 706, 708 at dedicated pins 712, 714, 716 to bias each MR head 704, 706, 708, respectively. Current intensity in the push-pull current sources 724, 726, 728 is regulated by corresponding triple MR bias differential feedback loops 730 to a programmable DC current in the associated head (current bias), or to the value required to develop a specified DC voltage (voltage bias) across the associated head. In some embodiments, the MR bias differential feedback loops 730 are configurable to current bias mode or voltage bias mode by mode selector input 734. In some other embodiments, the push-pull MR bias sources 730 are statically configured to either current bias mode or voltage bias mode.

A secondary balance feedback loop 732 for each of the push-pull current sources 724, 726, 728 enforces push-pull currents. Provision of push-pull MR bias sources 724, 726, 728 allows each MR head 704, 706, 708 to be independently biased and eliminates MR bias inaccuracy due to current imbalance. If desired, bias source polarities can be reversed.

The MR bias differential feedback loops 730 can use any suitable circuitry for controlling current in and out of each MR read head 704, 706, 708. Based upon the disclosure provided herein, one of ordinary skill in the art will recognize a variety of current regulating feedback circuits that may be used in relation to different embodiments of the present invention. Similarly, the balance feedback loops 732 can use any suitable circuitry for detecting imbalances between the push current and the pull current in push-pull current sources 724, 726, 728.

In current bias mode, the push-pull current source 724, controlled or regulated by its associated MR bias differential feedback loop 730 and balance feedback loop 732, establishes a specified bias current $I_{MR0}$ through MR head 704. In voltage bias mode, the push-pull current source 724, controlled or regulated by its associated MR bias differential feedback loop 730 and balance feedback loop 732, establishes a specified bias current $I_{MR0}$ through MR head 704 required to develop a specified DC voltage across MR head 704, hence across terminals $V_{COMM}$ 710 and $V_0$ 712.

In current bias mode, the push-pull current source 726, controlled or regulated by its associated MR bias differential feedback loop 730 and balance feedback loop 732, establishes a specified bias current $I_{MR1}$ through MR head 706. In voltage bias mode, the push-pull current source 726, controlled or regulated by its associated MR bias differential feedback loop 730 and balance feedback loop 732, establishes a specified bias current $I_{MR1}$ through MR head 706 required to develop a specified DC voltage across MR head 706, hence across terminals $V_{COMM}$ 710 and $V_1$ 714.

In current bias mode, the push-pull current source 728, controlled or regulated by its associated MR bias differential feedback loop 730 and balance feedback loop 732, establishes a specified bias current $I_{MR2}$ through MR head 708. In voltage bias mode, the push-pull current source 728, controlled or regulated by its associated MR bias differential feedback loop 730 and balance feedback loop 732, establishes a specified bias current $I_{MR2}$ through MR head 708 required to develop a specified DC voltage across MR head 708, hence across terminals $V_{COMM}$ 710 and $V_2$ 716.

To maintain low head-to-disc potential and prevent arcing across the nanometer-length fly-height distance, a common-mode voltage (CMV) loop 748 regulates the mean end-to-end voltage of the string of MR heads 704, 706, 708 to zero, or to a programmable value 746 chosen by the user. The common-mode voltage 748 is calculated as the mean voltage over all the MR head pins:

$$V_{CM\_Parallel} = \frac{1}{6}(V_0 + V_1 + V_2 + 3V_{Comm}) \quad \text{(Eq 6)}$$

where Equation 6 pertains to the case of all-good read heads. If any head(s) are faulty, their contribution to Equation 6 are omitted. Thus, in the case of defective head 0, Equation 6 is revised to:

$$V_{CM\_Parallel} = \frac{1}{4}(V_1 + V_2 + 2V_{Comm}) \quad \text{(Eq 7)}$$

In some embodiments in which LNAs associated with defective heads are powered down, buffered $V_{Comm}$ is taken from an active LNA.

Figure 8:
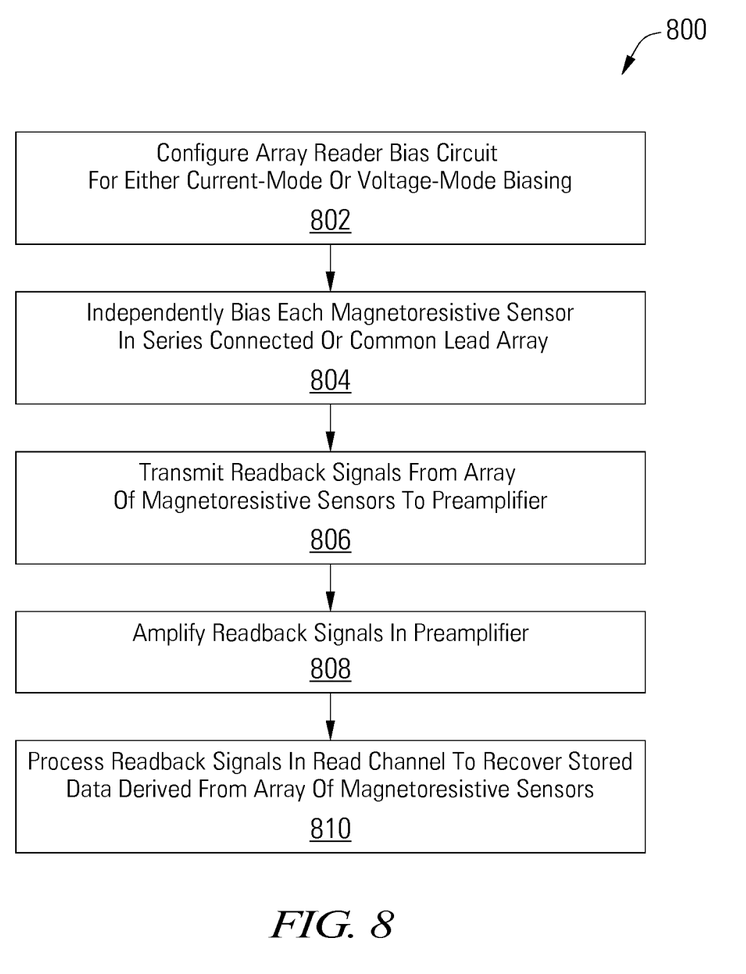
FIG. 8 is a flow diagram of an operation to process readback signals in a two-dimensional magnetic recording system with a series-connected array reader in accordance with some embodiments of the present invention.

Turning to FIG. 8, a flow diagram 800 is depicted of an operation to process readback signals in a two-dimensional magnetic recording system with a series-connected array reader in accordance with some embodiments of the present invention. Following flow diagram 800, an array reader bias circuit is configured for either current-mode biasing or voltage-mode biasing. (Block 802) Each MR head in a series-connected or shared-pin array reader is independently biased using either current or voltage mode biasing. (Block 804) The readback signals from the MR heads are transmitted to a preamplifier. (Block 806) In some embodiments, the preamplifier comprises one or more low-noise amplifiers. The head biasing can be performed by circuits in the preamplifier or in any other suitable location of the signal path. The readback signals are amplified in the preamplifier. (Block 808) The amplified readback signals are processed in a read channel to recover stored data retrieved by the array of MR sensors. (Block 810)

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

It should be noted that storage system 100 can be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such storage system 100, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

In addition, it should be noted that storage system 100 can be modified to include solid state memory that is used to store data in addition to the storage offered by disk platter 116. This solid state memory may be used in parallel to disk platter 116 to provide additional storage. In such a case, the solid state memory receives and provides information directly to read channel circuit 102. Alternatively, the solid state memory can be used as a cache where it offers faster access time than that offered by disk platter 116. In such a case, the solid state memory can be disposed between interface controller 106 and read channel circuit 102 where it operates as a pass through to disk platter 116 when requested data is not available in the solid state memory or when the solid state memory does not have sufficient storage to hold a newly written data set. Based upon the disclosure provided herein, one of ordinary skill in the art will recognize a variety of storage systems including both disk platter 116 and a solid state memory.

In conclusion, embodiments of the present invention provide novel systems, devices, methods and arrangements for a series-connected magnetoresistive reader for two-dimensional magnetic recording, which can also be configured for use with a shared-pin parallel-connected reader and which can be configured for either current-mode or voltage-mode biasing. While detailed descriptions of one or more embodiments of the invention have been given above, various alternatives, modifications, and equivalents will be apparent to those skilled in the art without varying from the spirit of the invention. Therefore, the above description should not be taken as limiting the scope of embodiments of the invention which are encompassed by the appended claims.

What is claimed is:

1. An apparatus for two-dimensional magnetic recording, comprising:
 a storage medium;
 an array of magnetoresistive read heads disposed adjacent the storage medium and spaced to read a data track;
 a plurality of leads connected to the array of magnetoresistive read heads; and
 a plurality of bias circuits connected to the array of magnetoresistive read heads by the plurality of leads, wherein the plurality of bias circuits can be configured to independently bias each of the array of magnetoresistive read heads with the array of magnetoresistive read heads electrically connected in series and with the array of magnetoresistive read heads electrically connected in parallel.

2. The apparatus of claim 1, wherein the plurality of bias circuits is configurable for current-bias mode and voltage-bias mode.

3. The apparatus of claim 1, wherein the plurality of bias circuits are embodied in a preamplifier circuit.

4. The apparatus of claim 1, wherein the plurality of bias circuits comprise a push-pull current source connected to each of the array of magnetoresistive read heads.

5. The apparatus of claim 4, wherein the push-pull current sources are each connected across one of the array of magnetoresistive read heads.

6. The apparatus of claim 4, further comprising a plurality of differential bias loop circuits, each connected to one of the push-pull current sources.

7. The apparatus of claim 6, wherein the plurality of differential bias loop circuits each comprise an operational transconductance amplifier sensing a voltage across a corresponding one of the read heads and driving a complementary pair of output driving transistors.

8. The apparatus of claim 7, wherein the operational transconductance amplifier is configured to sense a voltage across a corresponding one of the read heads when the plurality of bias circuits is configured for a voltage-bias mode.

9. The apparatus of claim 7, wherein the plurality of differential bias loop circuits each further comprise:
 a second complementary pair of transistors connected around a pair of current sensing resistors; and
 a reference current source connected across the pair of current sensing resistors, wherein the operational transconductance amplifier is configured to sense a voltage across the pair of current sensing resistors when the plurality of bias circuits is configured for a current-bias mode.

10. The apparatus of claim 4, further comprising a plurality of bias balance loop circuits, each connected to one of the push-pull current sources to balance a push source and a pull source in the push-pull current source.

11. The apparatus of claim 10, wherein the plurality of bias balance loop circuits each comprise:
 a first complementary pair of transistors with a current balance resistor connected between a central node of the first complementary pair of transistors and ground; and
 an operational transconductance amplifier sensing a voltage across the current balance resistor and driving the first complementary pair of transistors and a second complementary pair of output driving transistors.

12. The apparatus of claim 1, further comprising a plurality of low-noise amplifiers, each connected to one of the magnetoresistive read heads.

13. The apparatus of claim 12, wherein when the plurality of bias circuits are configured to bias the read heads connected in series, each of the low-noise amplifiers are connected across a different one of the series-connected read heads.

14. The apparatus of claim 12, wherein when the plurality of bias circuits are configured to bias the read heads connected in parallel, each of the low-noise amplifiers are connected between a shared pin for the array of magnetoresistive read heads and a dedicated pin for a different one of the parallel-connected read heads.

15. The apparatus of claim 12, further comprising a plurality of nulling feedback loops each connected to one of the low-noise amplifiers to cancel leakage current flow.

16. The apparatus of claim 12, further comprising a common-mode voltage loop connected to each of the low-noise amplifiers to control a common-mode voltage across the array of magnetoresistive read heads.

17. A method for accessing a magnetic storage device, comprising:
configuring a biasing circuit for an array of read heads according to whether the array of read heads is connected in series or in parallel;
configuring the biasing circuit for current-biasing mode or voltage-biasing mode;
passing the array of read heads over a data track on a storage medium; and
amplifying an analog signal from each read head in the array of read heads in a preamplifier.

18. The method of claim 17, further comprising biasing each read head in the array of read heads using a push-pull current source controlled by a differential bias current loop.

19. The method of claim 18, further comprising balancing a push source and a pull source in each of the push-pull current sources.

20. An apparatus for two-dimensional magnetic recording, comprising:
a storage medium;
an array of magnetoresistive read heads disposed adjacent the storage medium and spaced to read a data track;
a plurality of leads connected to the array of magnetoresistive read heads;
a plurality of bias circuits connected to the array of magnetoresistive read heads by the plurality of leads, wherein the plurality of bias circuits can be configured to independently bias each of the array of magnetoresistive read heads with the array of magnetoresistive read heads connected in series or in parallel, wherein the plurality of bias circuits comprise a push-pull current source connected to each of the array of magnetoresistive read heads; and
a plurality of differential bias loop circuits, each connected to one of the push-pull current sources.

* * * * *